April 12, 1927.

L. J. BLACK

GATE VALVE

Filed July 13, 1926

Inventor
Lee J. Black.
By
Attorney

April 12, 1927.

L. J. BLACK 1,624,465

GATE VALVE

Filed July 13, 1926      2 Sheets-Sheet 2

Inventor
Lee J. Black.
By Frederic S. Stitt,
Attorney

Patented Apr. 12, 1927.

1,624,465

UNITED STATES PATENT OFFICE.

LEE J. BLACK, OF BEAUMONT, TEXAS.

GATE VALVE.

Application filed July 13, 1926. Serial No. 122,261.

This invention relates to improvements in gate valves, and more particularly to a gate valve especially adapted for use in connection with oil well drilling apparatus to provide a means for shutting off the well in event of the generation of sudden pressure of oil or gas therein.

Gate valves employed with well drilling apparatus are installed at the head of the casing, so that in the drilling operation the tools pass therethrough. These valves are often, after opening thereof to start the drilling operation, idle for very long periods. In the drilling operation, particularly where rotary well drilling apparatus is employed, circulation fluid is employed for washing away the cuttings from the bits and this circulation fluid must pass through the valve. Not only is this circulation fluid full of rock cuttings which are being withdrawn from the bore, but the fluid itself consists of sand and slime in suspension in water, so that there is a great quantity of grit and dirt which may collect about and upon the gate of the valve and its seats and which tends to prevent the valve from seating properly. Furthermore, the fluid collecting about the operating parts of the valve has a tendency to cause the same to bind and stick, rendering operation of the valve difficult, if not impossible. In many instances, the stem of the valve will twist off without moving the gate. This is extremely dangerous, due to the fact that the valve has been installed for the purpose of taking care of emergencies, such as the flow of oil, which cannot be immediately taken care of or a rush of gas which, if unchecked, is liable to cause a very disastrous fire. Accordingly, an important object of this invention is the provision of a gate valve, the operating parts of which are so protected from the action of the fluid that the valve gate is undamaged thereby and there is no danger of the working parts sticking in operation.

A further and more specific object of the invention is to provide a gate valve, the gate of which is formed in two sections and the body of which is formed with a recess into which the gate is drawn when in inoperative or open position, this recess fitting the gate and particularly the seating faces of the gate, so as to exclude all fluid therefrom.

A still further object of the invention is the provision in a valve of this construction of a gate construction, such that the sections of the gate are sealed to one another, while the gate is in the open position, so that fluid may not pass between the sections for contact with the operating mechanism.

A still further object of the invention is to provide a valve of this character in which the working parts may be readily removed at any time for inspection or repair.

These and other objects I attain by the construction shown in the accompanying drawings, wherein for the purpose of illustration is shown a preferred embodiment of my invention and wherein:—

Figure 1:
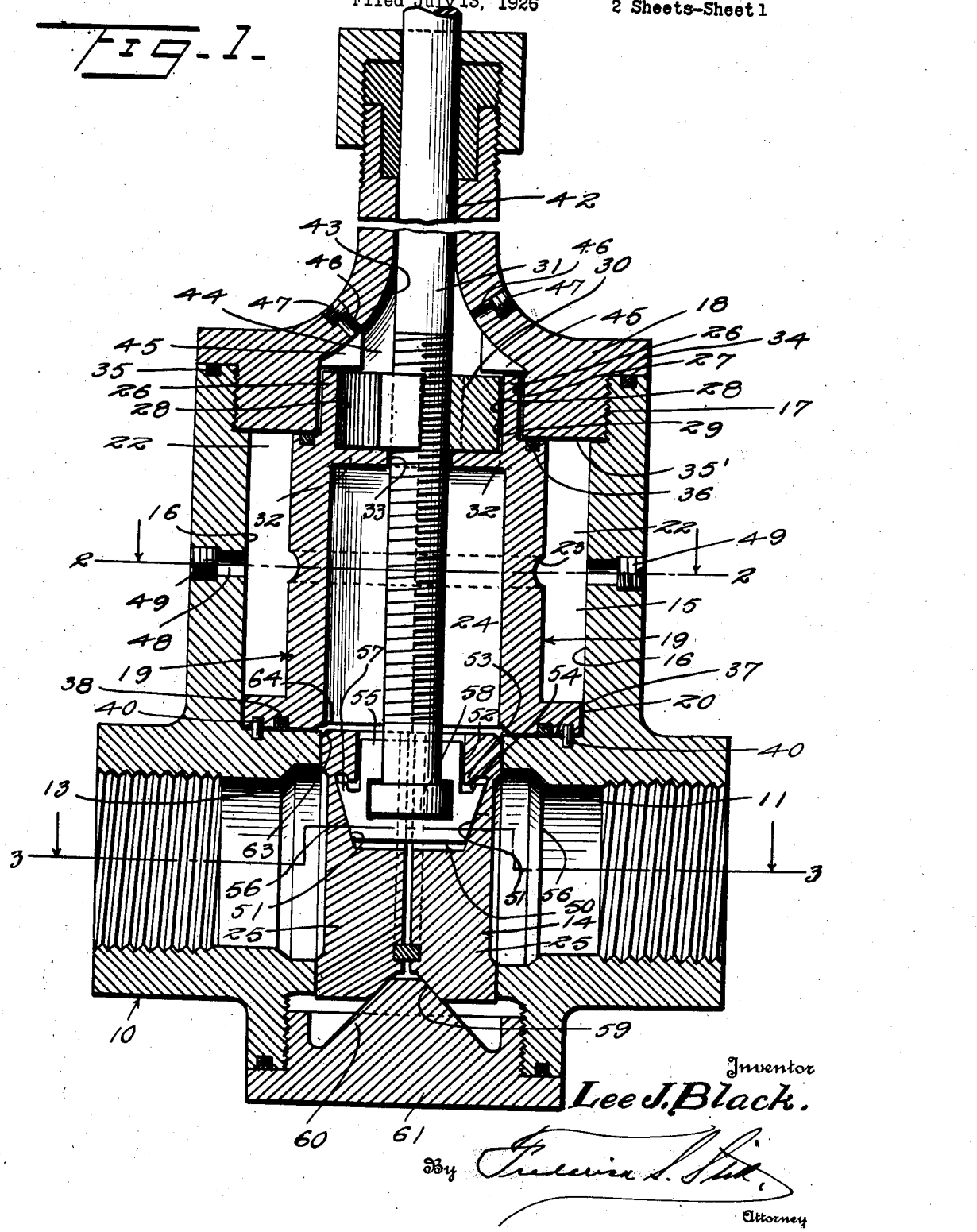
Figure 1 is a vertical sectional view through a gate valve constructed in accordance with my invention, the gate being shown in the closed position.
Figure 2:
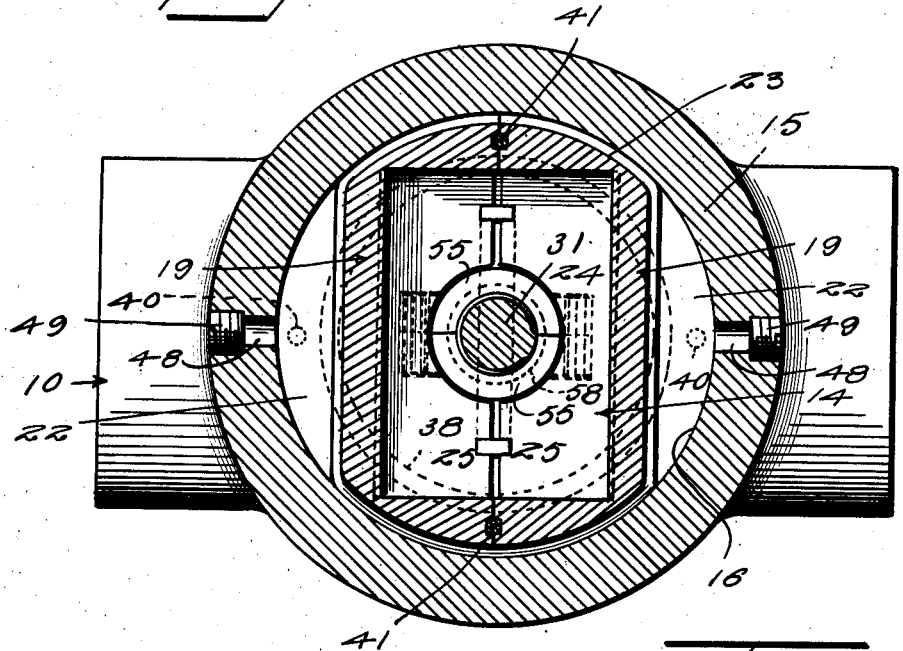
Figure 2 is a section on the line 2—2 of Figure 1.
Figure 3:
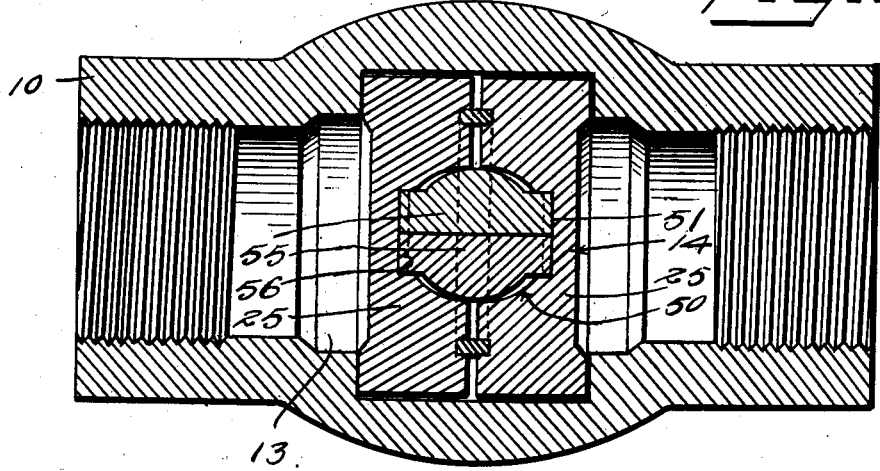
Figure 3 is a section on the line 3—3 of Figure 1.

Referring now more particularly to the drawings, the numeral 10 indicates the valve body having the usual bore 11 at the center of which is arranged the valve seat 12. In accordance with my invention, the bore adjacent the valve seat is enlarged, as at 13, so that tools passing through the bore will not engage with or damage the seat. The seat 12 is of the compound type, having confronting annular faces for coaction with the gate 14 of the valve. At one side of the body 10, a chamber 15 is produced, this chamber having a bore 16 of considerably greater diameter than the thickness of the gate. The outer end of this bore is enlarged and threaded, as at 17, for the reception of the valve bonnet 18.

Arranged within the bore are a pair of recess castings 19, the lower ends of which fit the bore 16, as indicated at 20. Above these lower ends, the faces of the recess castings are relieved, as at 21, so that between the walls of the bore and each recess casting 19, a chamber 22 is produced. These chambers 22 are placed in communication with one another by grooves 23 formed in the exterior of the castings. The castings have each formed therein recesses, which combine when the castings are in position within the bore 16, to produce a recess 24 of the same width and thickness as the sections 25 of the valve 14, when combined. The castings 19 each have an extension 26 fitting within a bore 27 formed in the lower end of the bonnet and these extensions are recessed at 28, so that they combine to produce a socket 29 receiving and fitting the nut 30 of a valve stem 31. Between the bottom of the socket 29 and the recess 24, a wall 32 is formed which has an opening 33 through which the valve stem 31 may pass.

The bonnet 18 has a flange 34 overlying and having a packing seal engagement at 35 with the upper end wall of the chamber 15. The bottom face 35′ of the nut seats upon the upper ends of the recess castings about the extension 26 thereof and has a packing seal engagement therewith at 36. The lower ends of the recess castings seat upon the lower end wall 37 of the bore 16 and have a packing seal engagement therewith at 38. The recess castings are preferably held against rotation within the bore 16 by means of dowel pins 40 or the like, so that any tendency on the part of the nut 30 to stick will not cause the recess castings to misalign with the seat 12. Between the edges of the sections of the recess castings packing 41 is employed. The bonnet 18 preferably has the bore 42 thereof, which fits the stem of the valve, connected with the counterbore 27 by a gradually curved wall 43, so that between the upper end of the counterbore and the lower end of the bore 42, an oil chamber 44 is produced. Projecting inwardly from this curved wall are lugs 45, which overlie the nut 30 and prevent excessive shifting movement thereof within the socket 29. The curved walls 43 have formed therein oil ports 46, the outer ends of which are sealed by removable plugs 47. These oil ports are diametrically opposed, so that no matter which face of the valve is arranged uppermost, oil may be placed in the chamber to lubricate the stem and nut. The chambers 22 are likewise for the reception of oil which lubricates the walls of the recess castings and the confronting wall of the chamber 15, so that any tendency of the recess castings to stick or bind is prevented. The walls of the chamber 15 are provided with diametrically opposed filling openings 48 suitably plugged, as at 49.

The sections 25 of the valve combine to form a body, adjacent the upper end of which is formed a transversely extending recess 50, the end walls of which converge downwardly, as at 51, and the upper end of which communicates with the upper end of the valve by a vertically extending passage 52. The upper wall of the recess at each section of the valve is provided with a depending lug 53, the outer face 54 of which inclines inwardly and downwardly. This recess receives an actuator 55 having at opposite side faces thereof tapered faces 56 for coaction with the end walls 51 of the recess and which has upon its upper face upstanding lugs 57, the inner faces of which are tapered for coaction with the faces 54 of the lugs 53. As the actuator is moved upwardly, the faces of these lugs, coacting with the faces of the lugs 53, tend to draw the sections 25 of the valve toward one another while, when the actuator is moved downwardly, the faces 56, coacting with the faces 51, tend to separate the sections of the valve. The actuator 55 is swiveled upon a head 58 formed upon the lower end of the valve stem 31. The lower ends of the valve sections 25 combine in the assembled relation of the sections to produce a frustro-conical recess 59. This recess as the valve reaches its seating position, has its walls engaged by a conical extension 60 formed on the inner face of the usual removable bottom plug 61, so that the lower ends, as well as the upper ends of the valve sections, are forced apart as the valve comes to its seat. Between adjacent faces of the valve sections, a U-shaped packing member 62 is arranged.

In the use of the valve, as the valve is drawn in the recess 24, rounded faces 63 upon the upper ends of the side faces of the gate sections 25 and 64 upon the lower ends of the walls of the chambers 24 come into engagement with one another. At this time, the lugs or hooks 57 are tending to draw the section 25 toward one another and as the valve forces its way into the chamber 24, these sections are moved further together, pressing adjacent faces thereof firmly against the packing member 62, so that not only are the seating faces of the valves sealed against fluid passing through the bore 11, but the adjacent faces of the sections are similarly protected by the seal provided by the gasket 62. The stem 31, when the gate is fully withdrawn, will have substantially its entire threaded section arranged within the bore 42, the nut 30 and oil chamber 44, so that a complete lubrication thereof is provided. When the valve is being seated, an initial movement of the stem will advance the operator 55 which will tend to spread the gate sections 25. Therefore, the outer edges of the valve will very closely follow the faces of the seat 12, scraping therefrom any accumulated muck, so that the seat is cleaned and ready for the valve when it comes to sealing position. As it arrives at sealing position, its movement is checked by the lug 60 of the plug 61, so that greater force may be brought to bear to force apart the upper portions of the sections and insure a proper seating thereof against the faces of the valve seat. Lubrication of the recess castings 19 and of the stem insures against sticking of any of the portions of the valve and proper operation thereof, when an operation is desired, and furthermore, facilitates the making of any necessary repairs upon the valve. It is pointed out that by removing the bonnet 18, the entire unit consisting of the bonnet, recess castings 19 and gate 14 can be bodily withdrawn from the valve for inspection or repair.

Since the construction hereinbefore set forth is capable of a certain range of change and modification without materially departing from the spirit of the invention, I do not limit myself to such specific structure except as hereinafter claimed.

I claim:—

1. In a gate valve, a casing having a seat, a gate for coaction with the seat, the casing having a recess into which the gate may be withdrawn, a stem for shifting the gate from the seat to the recess, said gate being formed in two separable sections having a compressible gasket arranged therebetween, the sections of the gate and the walls of the recess having engagement with one another whereby the sections of the gate are forced into engagement with one another to thereby compress the gasket and seal the space between adjacent faces of the gate as the gate is drawn into the recess.

2. In a gate valve, a casing having a seat, a gate for coaction with the seat, the casing having a recess into which the gate may be withdrawn, a stem for shifting the gate from the seat to the recess, said gate being formed in two separable sections having a compressible gasket arranged therebetween, the sections of the gate and the walls of the recess having engagement with one another whereby the sections of the gate are forced into engagement with one another to thereby compress the gasket and seal the space between adjacent faces of the gate as the gate is drawn into the recess and means connecting the sections of the gate with the stem shifting the sections of the gate toward one another upon initial movement of the stem in a direction to shift the gate from the seat to the recess.

3. In a gate valve, a casing having a seat, a gate for coaction with the seat, the casing having a recess into which the gate may be withdrawn, a stem for shifting the gate from the seat to the recess, said gate being formed in two separable sections having a compressible gasket arranged therebetween, the sections of the gate and the walls of the recess having engagement with one another whereby the sections of the gate are forced into engagement with one another to thereby compress the gasket and seal the space between adjacent faces of the gate as the gate is drawn into the recess and means connecting the sections of the gate with the stem shifting the sections of the gate toward one another upon initial movement of the stem in a direction to shift the gate from the seat to the recess and urging separation of the gate sections upon primary movement of the stem in a direction to shift the valve from the recess to the seat.

4. In a gate valve, a casing having a seat, a gate for coaction with the seat, the casing having a recess into which the gate may be withdrawn, a stem for shifting the gate from the seat to the recess, said gate being formed in two separable sections having a compressible gasket arranged therebetween, the sections of the gate and the walls of the recess having engagement with one another whereby the sections of the gate are forced into engagement with one another to thereby compress the gasket and seal the space between adjacent faces of the gate as the gate is drawn into the recess, the outer faces of the sections having sealing engagement with the opposed walls of the recess when the gate is in position within the recess.

5. In a gate valve, a casing having a seat embodying opposed wall faces, a chamber formed by one wall of the casing and communicating with the seat through an opening, a bonnet engaged with the outer end of the chamber wall, a stem passed through the bonnet, a gate formed in two sections secured to the inner end of said stem, means mounted within the chamber and having sealing engagement with the inner end of the chamber and with the bonnet and providing a recess aligned with the opening of the casing wall into which the gate may be drawn and having opposed wall faces, the outer faces of the gate and the opposed faces of the recess having sealing engagement with one another when the gate is drawn within the recess, the walls of the recess being spaced apart a distance less than the distance between the opposed faces of the seat of the casing, the connection between the gate and stem including a part spreading the sections of the gate as the gate is moved from the recess to the seat.

6. In a gate valve, a casing having a seat embodying opposed wall faces, a chamber formed by one wall of the casing and communicating with the seat through an opening, a bonnet engaged with the outer end of the chamber wall, a stem passed through the bonnet, a gate formed in two sections secured to the inner end of said stem, means mounted within the chamber and having sealing engagement with the inner end of the chamber and with the bonnet and providing a recess aligned with the opening of the casing wall into which the gate may be drawn and having opposed wall faces, the outer faces of the gate and the opposed faces of the recess having sealing engagement with one another when the gate is drawn within the recess, the walls of the recess being spaced apart a distance less than the distance between the opposed faces of the seat of the casing, the connection between the gate and stem including a part spreading the sections of the gate as the gate is moved from the recess to the seat and a casing wall at the opposite side of the casing from said recess having a removable plug the inner face of which is provided with means engaging the gate sections and separating the same as the gate aligns with its seat.

7. In a gate valve, a casing having a seat embodying opposed wall faces, a chamber formed by one wall of the casing and communicating with the seat through an opening, a bonnet engaged with the outer end of the chamber wall, a stem passed through the bonnet, a gate formed in two sections secured to the inner end of said stem, means mounted within the chamber and having sealing engagement with the inner end of the chamber and with the bonnet and providing a recess aligned with the opening of the casing wall into which the gate may be drawn and having opposed wall faces, the outer faces of the gate and the opposed faces of the recess having sealing engagement with one another when the gate is drawn within the recess, the walls of the recess being spaced apart a distance less than the distance between the opposed faces of the seat of the casing, the connection between the gate and stem including a part spreading the sections of the gate as the gate is moved from the recess to the seat and shifting the gate sections toward one another when the stem is actuated to shift the gate from its seat to said recess.

8. In a gate valve, a casing having a seat embodying opposed wall faces, a chamber formed by one wall of the casing and communicating with the seat through an opening, a bonnet engaged with the outer end of the chamber wall, a stem passed through the bonnet, a gate formed in two sections secured to the inner end of said stem, means mounted within the chamber and having sealing engagement with the inner end of the chamber and with the bonnet and providing a recess aligned with the opening of the casing wall into which the gate may be drawn and having opposed wall faces, the outer faces of the gate and the opposed faces of the recess having sealing engagement with one another when the gate is drawn within the recess, the walls of the recess being spaced apart a distance less than the distance between the opposed faces of the seat of the casing, the connection between the gate and stem including a part spreading the sections of the gate as the gate is moved from the recess to the seat and shifting the gate sections toward one another when the stem is actuated to shift the gate from its seat to said recess, the upper edges of the gate sections and the lower ends of the walls of the recess having coacting faces shifting the gate sections toward one another as the gate moves into the recess.

9. In a gate valve, a casing having a seat embodying opposed wall faces, a chamber formed by one wall of the casing and communicating with the seat through an opening, a bonnet engaged with the outer end of the chamber wall, a stem passed through the bonnet, a gate formed in two sections secured to the inner end of said stem, means mounted within the chamber and having sealing engagement with the inner end of the chamber and with the bonnet and providing a recess aligned with the opening of the casing wall into which the gate may be drawn and having opposed wall faces, the outer faces of the gate and the opposed faces of the recess having sealing engagement with one another when the gate is drawn within the recess, the walls of the recess being spaced apart a distance less than the distance between the opposed faces of the seat of the casing, the connection between the gate and stem including a part spreading the sections of the gate as the gate is moved from the recess to the seat and shifting the gate sections toward one another when the stem is actuated to shift the gate from its seat to said recess, the upper edges of the gate sections and the lower ends of the walls of the recess having coacting faces shifting the gate sections toward one another as the gate moves into the recess and a gasket arranged between the gate sections and compressed when the gate sections are positioned within the recess.

10. In a gate valve, a casing having a seat, a chamber formed by one wall of the casing and communicating with the seat through an opening, a bonnet engaged with the outer end of the chamber wall, a stem passed through the bonnet, a gate formed in two sections secured to the inner end of said stem, means mounted within the chamber and having sealing engagement with the inner end of the chamber and with the bonnet and providing a recess aligned with the opening of the casing wall into which the gate may be drawn and having opposed wall faces, the outer faces of the gate and the opposed faces of the recess having sealing engagement with one another when the gate is drawn within the recess, said means providing at its outer end a socket, a nut for the stem fitting within said socket and means upon the bonnet adapted to be engaged by the nut to limit the movement of the nut within the socket.

11. In a gate valve, a casing having a seat, a chamber formed by one wall of the casing and communicating with the seat through an opening, a bonnet engaged with the outer end of the chamber wall, a stem passed through the bonnet, a gate formed in two sections secured to the inner end of said stem, means mounted within the chamber and having sealing engagement with the inner end of the chamber and with the bonnet and providing a recess aligned with the opening of the casing wall into which the gate may be drawn and having opposed wall faces, the outer faces of the gate and the opposed faces of the recess having sealing engagement with one another when the gate is drawn within the recess, said means providing at its outer end a socket, a nut for the stem fitting within said socket, means upon the bonnet adapted to be engaged by the nut to limit the movement of the nut within the socket, the bonnet affording a space about the stem adjacent the nut and means for permitting the introduction of a lubricant to said space.

In testimony whereof I affix my signature.

LEE J. BLACK.